United States Patent
Li et al.

(10) Patent No.: US 8,970,598 B1
(45) Date of Patent: Mar. 3, 2015

(54) VISUALIZING THE SIMILARITY OF RESOURCES IN A DISTRIBUTED EXECUTION ENVIRONMENT

(71) Applicant: Amazon Technologies, Inc., Seattle, WA (US)

(72) Inventors: Gang Li, Bellevue, WA (US); Weizhong Hua, Bellevue, WA (US); Chengliang Zhang, Sammamish, WA (US); Baogang Song, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 97 days.

(21) Appl. No.: 13/693,835

(22) Filed: Dec. 4, 2012

(51) Int. Cl.
   *G06T 11/20* (2006.01)
(52) U.S. Cl.
   CPC .................................... *G06T 11/206* (2013.01)
   USPC .......................................... 345/440; 705/7.12
(58) Field of Classification Search
   CPC ................................................ G06F 17/30554
   USPC .......................................... 345/440; 705/7.12
   See application file for complete search history.

(56) References Cited

U.S. PATENT DOCUMENTS

| | | |
|---|---|---|
| 8,146,009 B2 | 3/2012 | Mason et al. |
| 2010/0169326 A1* | 7/2010 | Ma et al. ................... 707/749 |

OTHER PUBLICATIONS

"Minhash", Wikipedia [online][retrieved on Oct. 23, 2012] retrieved from: http://en.wikipedia.org/wiki/Minhash 5 pps.
"Sadiq's Thoughts: Finding Similar Items Using Minhashing" [online][retrieved on Oct. 23, 2012] retrieved from: www.toao.com/posts/finding-similar-items-key-store-minhashing.html 4 pps.

* cited by examiner

*Primary Examiner* — Maurice L McDowell, Jr.
(74) *Attorney, Agent, or Firm* — Lee & Hayes, PLLC

(57) ABSTRACT

A distributed execution environment includes various resources, such as instances of computing resources, hardware resources, and software resources. Values for attributes of the resources are collected. The collected attribute values for the resources are utilized to compute minhash values for the resources that describe the similarity between the resources. The computed minhash values are then utilized to generate a resource similarity visualization that provides a visual indication of the similarity between the resources.

22 Claims, 7 Drawing Sheets

US 8,970,598 B1

VISUALIZING THE SIMILARITY OF RESOURCES IN A DISTRIBUTED EXECUTION ENVIRONMENT

BACKGROUND

Some network-based services allow customers to purchase and utilize instances of computing resources ("instances"), such as virtual machine instances, on a permanent or as-needed basis. In addition to virtual machine instances, these services typically allow customers to purchase and utilize instances of other types of computing resources for use with the virtual machine instances. For example, customers might be permitted to purchase and utilize instances of data storage resources, instances of database resources, instances of networking resources, and instances of other types of resources.

Network-based services such as those described above might include large numbers of resources, such as the instances of computing resources described above and the hardware and software resources utilized to provide the instances. For example, some network-based services might utilize hundreds of thousands or even millions of server computers in order to provide virtual machine instances and other types of instances of computing resources. Each of these server computers has its own configuration of hardware and installed software. Consequently, there may be tens or even hundreds of thousands of unique combinations of hardware and software components in such a service. This large number of possible combinations of hardware and software can make the management of such a service extremely complex.

The disclosure made herein is presented with respect to these and other considerations.

DETAILED DESCRIPTION

Figure 1:
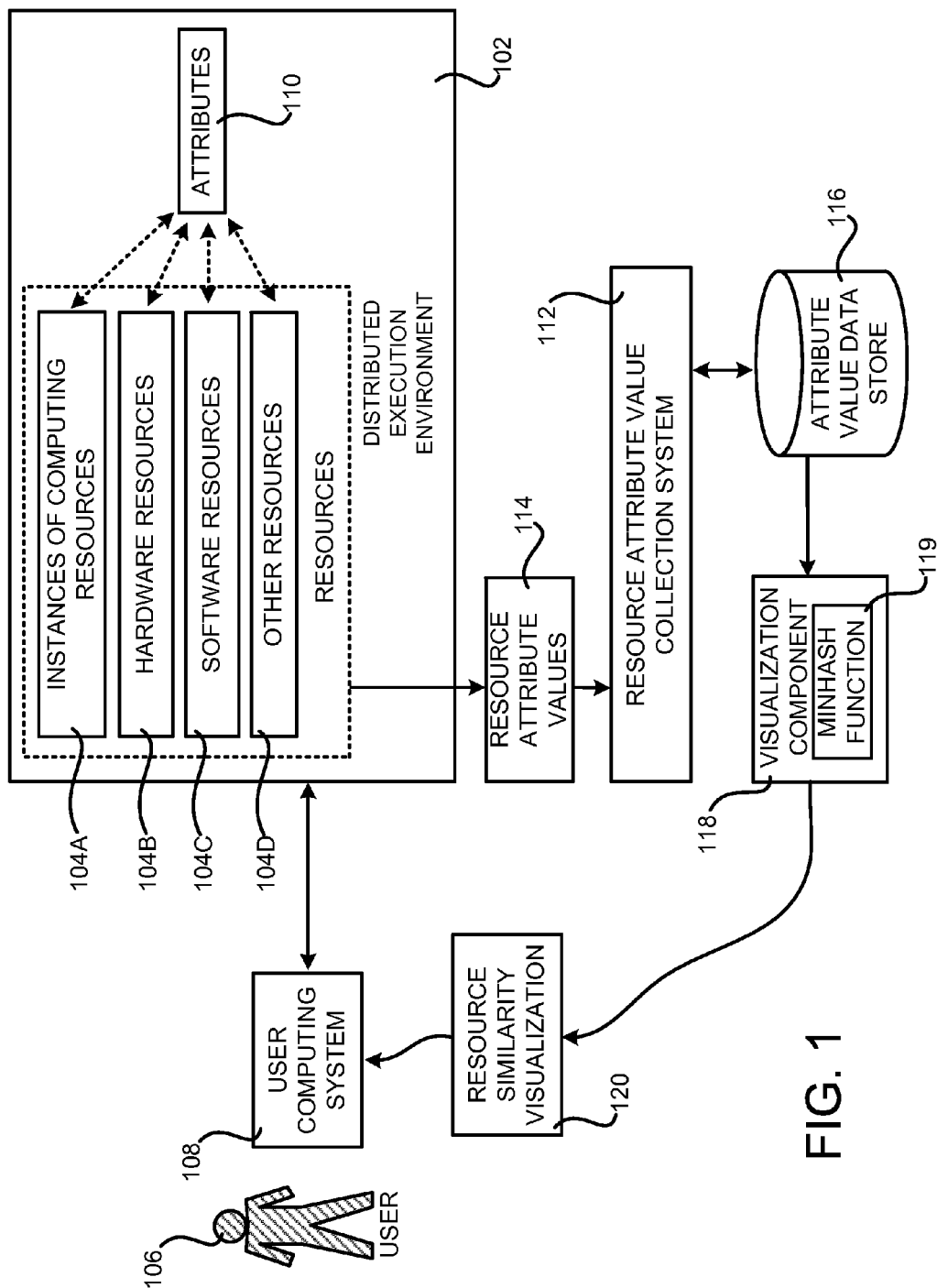
FIG. 1 is a computer system diagram providing an overview description of one mechanism disclosed herein for visualizing the similarity of resources in a distributed execution environment, according to one embodiment presented herein.

The following detailed description is directed to technologies for visualizing the similarities between resources in a distributed execution environment. Utilizing the concepts and technologies described herein, a resource similarity visualization can be generated that visually indicates the similarity of resources in a distributed execution environment, such as software and hardware resources. The resource similarity visualization can be utilized to quickly view the similarities between resources in services utilizing hundreds of thousands or even millions of resources. The identified similarities (and differences) between resources might be utilized to perform management actions with regard to the resources. Additional details regarding these and other features will be provided below.

According to one aspect presented herein, a computer-implemented mechanism is disclosed for visualizing the similarity between resources in a distributed execution environment. In one implementation, the mechanism operates in conjunction with a network-based distributed execution environment in which customers can purchase, configure, and utilize instances of computing resources, such as virtual machine instances, data storage resources, networking resources, and database resources, on a permanent or as-needed basis.

The distributed execution environment may offer instances of computing resources for purchase and use in various configurations. For example, the distributed execution environment might offer virtual machine instances available for purchase and use that have many different configurations of processor capabilities, main memory, disk storage, and operating system. A customer might create, configure, and deploy various combinations of instances of computing resources to create "solutions" that provide various types of functionality, such as application hosting, backup and storage, content delivery, Web hosting, enterprise IT solutions, database services, and others.

The distributed execution environment described above might include various types of resources including, but not limited to, instances of computing resources such as those described above, hardware resources such as server computers, software resources, and other types of resources. As will be described in greater detail below, the technologies disclosed herein can be utilized to create visualizations showing the similarities between these, and potentially other, types of resources in the distributed execution environment.

In one implementation, a resource attribute value collection component operates in conjunction with the distributed execution environment. The resource attribute value collection component collects values for attributes of the various resources in the distributed execution environment. For example, the resource attribute value collection component might collect values for the hardware attributes of the resources. Hardware attributes include, but are not limited to, central processing unit ("CPU") type, installed memory, disk capacity, hardware manufacturer, hardware vendor, firmware type, Basic Input/Output System ("BIOS") type and settings, and other data relating to the hardware configuration of a resource. The resource attribute value collection component might also collect values for software attributes of the resources. Software attributes include, but are not limited to, installed software packages, version numbers, software configuration, software manufacturer, software vendor, and other data relating to the software utilized by a resource in the distributed execution environment. The resource attribute value collection component might also collect values for other types of attributes of the resources.

In one embodiment, a visualization component is configured to utilize the attribute values collected for the resources in the distributed execution environment to generate a resource similarity visualization. The resource similarity visualization is a visual indication of the similarity of resources within the distributed execution environment. For example, the resource similarity visualization might be a 2-dimensional ("2D") or a three-dimensional ("3D") graph showing representations of the resources within the distributed execution environment and indicating the similarity between the resources. By indicating the similarity between the resources, the resource similarity visualization might also indicate the differences between resources. In other implementations, the resource similarity visualization might be presented as a 1-dimensual ("1D") representation or as a representation having greater than three dimensions.

In order to generate the resource similarity visualization, the visualization component generates minhash values for the resources in the distributed execution environment in one implementation. The minhash values are generated using a minhash function that computes the similarities between sets of values utilizing hash functions. For example, in some embodiments, a minhash value is generated for each of the resources based upon all or a subset of the attribute values associated with the resource. The minhash values are then utilized to create the resource similarity visualization.

In one particular embodiment, a minhash value is generated for the resources based upon a subset of the attribute values associated with each resource. For example, a minhash value might be generated for each resource based upon only certain software or hardware attributes associated with the resource. Another minhash value is also generated for the resources based upon a different subset of the attribute values associated with each resource. For instance, a second minhash value might be generated based upon a different set of software attributes associated with each resource.

The different minhash values computed for each resource might then be utilized to generate the resource similarity visualization for the resources. For example, in one implementation, the resource similarity visualization is a 2D graph that has one axis corresponding to minhash values for one subset of the attributes and another axis corresponding to minhash values for another subset of the attributes for the resources. The resource similarity visualization is generated by plotting the minhash values for each resource on the graph. The resources shown in the resource similarity visualization might include all of the resources in the distributed execution environment or might be limited to some subset of the resources. For example, only resources purchased for use by a customer of the distributed execution environment might be represented.

In some implementations, the computed minhash values might be also be utilized to take various types of management actions with regard to resources in the distributed execution environment. For example, resources may be identified using the minhash values that are likely to fail at some future point in time. Appropriate remedial action might be taken to minimize the possibility of failure of these resources. In this regard, the failure status of a resource (i.e. whether a resource has failed or not) might be considered an attribute of the resource and utilized to compute the minhash values in the manner described above.

Similarly, resources might be identified using the minhash values that require a software or hardware update. The required update might then be applied to the identified resources. Other types of actions might also be taken with regard to resources in the distributed execution environment using the computed minhash values. Additional details regarding the various components and processes described above for visualizing the similarity between resources in a distributed execution environment will be presented below with regard to FIGS. 1-7.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may be practiced in distributed execution environments, where tasks are performed by remote processing devices that are linked through a communications network. In a distributed execution environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a computer system diagram providing an overview description of a mechanism disclosed herein for visualizing the similarity between resources in a distributed execution environment 102, according to one embodiment presented herein. In one embodiment, the mechanism disclosed herein operates in conjunction with a network-based distributed execution environment 102 in which customers can purchase and utilize instances of computing resources 104A, such as virtual machine instances, on a permanent or as-needed basis. The distributed execution environment 102 may offer instances of computing resources 104A for purchase in various configurations. For example, the distributed execution environment 102 might offer virtual machine instances available for purchase and use that have many different configurations of processor capabilities, main memory, disk storage, and operating system.

The distributed execution environment 102 might also offer instances of other types of computing resources 104A for purchase and use by customers. For example, the distributed execution environment 102 might offer data storage resources, networking resources, database resources, and other types of resources on a permanent or as needed basis. The operator of the distributed execution environment 102 may charge a fee for operating the instances of computing resources 104A to the customer that creates the instances. Various different pricing models might be utilized to charge a customer for the use of instances of computing resources 104A within the distributed execution environment 102. Additional details regarding the configuration and operation of the distributed execution environment 102 in one implementation will be provided below with regard to FIGS. 5 and 6.

In addition to the instances of computing resources 104A described above, the distributed execution environment 102 might also include many other types of resources. For example, and without limitation, the distributed execution environment 102 might also include hardware resources 104B, such as server computers, and software resources 104C, such as operating systems and application programs. The distributed execution environment 102 might also include other types of resources 104D.

The hardware resources 104B and the software resources 104C might be utilized to provide the instances of computing resources 104A and/or for other purposes. For example, hardware resources 104B like host computers might be equipped with appropriate software resources 104C for providing virtual machine instances and/or other types of instances of computing resources 104A. The distributed execution environment 102 might also include other types of resources 104D not shown in FIG. 1 or identified explicitly above. As will be described in greater detail below, the technologies disclosed herein can be utilized to create visualizations showing the similarities between these, and potentially other, types of resources 104 in the distributed execution environment 102.

The various types of resources 104 in the distributed execution environment 102 might have one or more associated attributes 110. The attributes 110 might describe various characteristics of the resources 104 with which they are associated. For instance, the hardware resources 104B might have associated attributes 110 that describe aspects of the hardware, such as but not limited to, CPU type, installed memory, disk capacity, hardware manufacturer, hardware vendor, and other data relating to the hardware configuration of a resource. A server computer utilized to execute virtual machine instances in the distributed execution environment 102, for example, might have associated hardware attributes 110 that describe its hardware configuration.

The hardware resources 104B might also have associated attributes 110 that describe aspects of the software installed on the hardware resources 104B. For instance, such software attributes 110 include, but are not limited to, installed software packages, version numbers, software configuration, software manufacturer, software vendor, and other data relating to the software utilized by a resource in the distributed execution environment. A server computer utilized to execute virtual machine instances in the distributed execution environment, for example, might also have associated software attributes 110 that describe the software installed on the server computer.

Software resources 104C in the distributed execution environment 102 might also have associated attributes 110 describing aspects of the software. Similarly, the other types of resources 104D in the distributed execution environment 102 might also have associated attributes 110. As will be described in greater detail below, resource attribute values 114 (which may be referred to as "resource attribute values" or simply "values") for the attributes 110 associated with the resources 104 in the distributed execution environment 102 may be collected and utilized to generate a resource similarity visualization 120 that visually indicates the similarities between resources 104 in the distributed execution environment 102.

As shown in FIG. 1, a resource attribute value collection system 112 might operate external to, or within, the distributed execution environment 102 in one embodiment. The resource attribute value collection system 112 collects values 114 for attributes of the various resources 104 in the distributed execution environment 102. For example, the resource attribute value collection system 112 might collect values for the hardware and software attributes 110 of the resources 104 described above. The resource attribute value collection system 112 might also collect values for other types of attributes 110, such as the location of resources 104, the usage of resources 104, and others. The resource attribute value collection system 112 might also collect values 114 for the attributes 110 of the other resources 104D in the distributed execution environment 102.

Although the resource attribute value collection system 112 is illustrated in FIG. 1 as operating outside the distributed execution environment 102, it should be appreciated that all or a part of the resource attribute value collection system 112 may operate within the distributed execution environment 102 in other embodiments. For example, in one implementation, a software component (not shown) is executed on the hardware resources 104B in the distributed execution environment 102 that collects the values 114 from the resources 104 and provides the values 114 to the resource attribute value collection system 112. In turn, the resource attribute value collection system 112 stores the collected values 114 in an attribute value data store 116 in one embodiment. The attribute value data store 116 is a relational database in one implementation, but other types of data stores might also be utilized.

In some embodiments, an asset inventory system is utilized to collect and store the values 114 for the attributes 110 of the resources 104. In other implementations, this functionality is provided by a software deployment system. It should be appreciated, however, that other types of systems and components operating within and/or external to the distributed execution environment 102 might also be utilized to collect and store the values 114 for the attributes 110 associated with the resources 104.

The resource attribute value collection system 112 might also make the collected values 114 available for use by other programs and/or components. For example, the resource attribute value collection system 112 might expose an application programming interface ("API") through which other components can obtain the values 114 stored in the attribute value data store 116. In other embodiments, components might obtain the values 114 for the attributes 110 directly from the attribute value data store 116. Other components might access the values 114 stored in the attribute value data store 116 in other ways in other embodiments.

In one implementation, a visualization component 118 is configured to utilize the values 114 collected for the attributes 110 of the resources 104 in the distributed execution environment 102 to generate a resource similarity visualization 120. As mentioned briefly above, the resource similarity visualization 120 provides a visual indication of the similarity of resources 104 within the distributed execution environment 102. For example, the resource similarity visualization 120 might be a 2D or 3D graph showing representations of the resources 104 within the distributed execution environment 102 and indicating the similarities between the resources 104. Additional details regarding the generation of the resource similarity visualization 120 are provided below.

The visualization component 118 is a software component executing on a hardware device within or external to the distributed execution environment 102 in one implementation. For example, the visualization component 118 might be a software component executing on a server computer or within a virtual machine instance in the distributed execution environment 102. In another embodiment, the visualization component 118 might be a software component executing on a device external to the distributed execution environment 102. For example, the visualization component 118 might execute on the user computing system 108 operated by the user 106. The visualization component 118 might also be implemented in special-purpose hardware or a combination of software and hardware. Other implementations might also be utilized.

The user 106 shown in FIG. 1 might be an administrator of the distributed execution environment 102. In this case, the user 106 might be permitted to generate a resource similarity visualization 120 that encompasses all or a subset of all of the resources 104 in the distributed execution environment 102. In another embodiment, the user 106 is a customer of the distributed execution environment 102. In this scenario, the user 106 might be limited to generating a resource similarity visualization 120 that encompasses only those resources 104 within the distributed execution environment 102 that have been purchased by the customer. The resources 104 represented in a resource similarity visualization 120 might also be limited in other ways in other embodiments.

In order to generate the resource similarity visualization 120, the visualization component 118 generates similarity values that describe the similarity between sets of attributes 110 of the resources 104 included in the resource similarity visualization 120. As utilized herein, the term similarity refers to the Jaccard Similarity of a set of attributes 110. The Jaccard Similarity is the number of elements two sets have in common divided by the total number of elements in both sets. A similarity value of zero indicates that two sets contain no elements in common. A similarity value of one indicates that the sets contain the same elements. The Jaccard Similarity may be represented as $J(A,B)=|A \cap B|/|A \cup B|$. In order to compute the Jaccard Similarity, collections of resources 104 in the distributed execution environment 102 are treated as sets, and the values 114 for all or a subset of the attributes 110 for the resources 104 are treated as the set elements.

In one particular implementation, the similarity values are minhash values. In this implementation, the visualization component 118 utilizes a minhash function 119 to quickly estimate how similar sets of attribute values 114 are. For example, the visualization component 118 might utilize the minhash function 119 to generate minhash values for all or a subset of the attributes 110 of the resources 104 included in a resource similarity visualization 120. As known in the art, a minhash function 119 estimates the similarities between sets of attribute values utilizing hash functions. The generated minhash values are then utilized to create the resource similarity visualization 120.

Different has functions might be utilized in various implementations. For example, different implementations of the technologies disclosed herein might utilize the Java-.lang.string hashcode, might utilize CRC32 as a hash function, or might utilize the Jenkins hash function. In order to apply one of these hash functions to resources on a host computer, for instance, the minhash is initially set to infinity. Then, for each resource, the hash value is calculated. If the hash value is less than the minhash, then the minhash is set to the hash value.

In order to generate a resource similarity visualization 120, the user 106 might first be permitted to select the resources 104 that should be represented in the resource similarity visualization 120. For example, and as described above, an administrator of the distributed execution environment 102 might be permitted to select all or a subset of all of the resources 104 in the distributed execution environment 102 for inclusion in the resource similarity visualization 120. A customer of the distributed execution environment 102 might, however, be limited to selecting only all or a subset of the resources 104 purchased by the customer. Other types of users 106 might be similarly limited to selecting other subsets of the resources 104 in the distributed execution environment 102 for inclusion in a resource similarity visualization 120.

Figure 4:
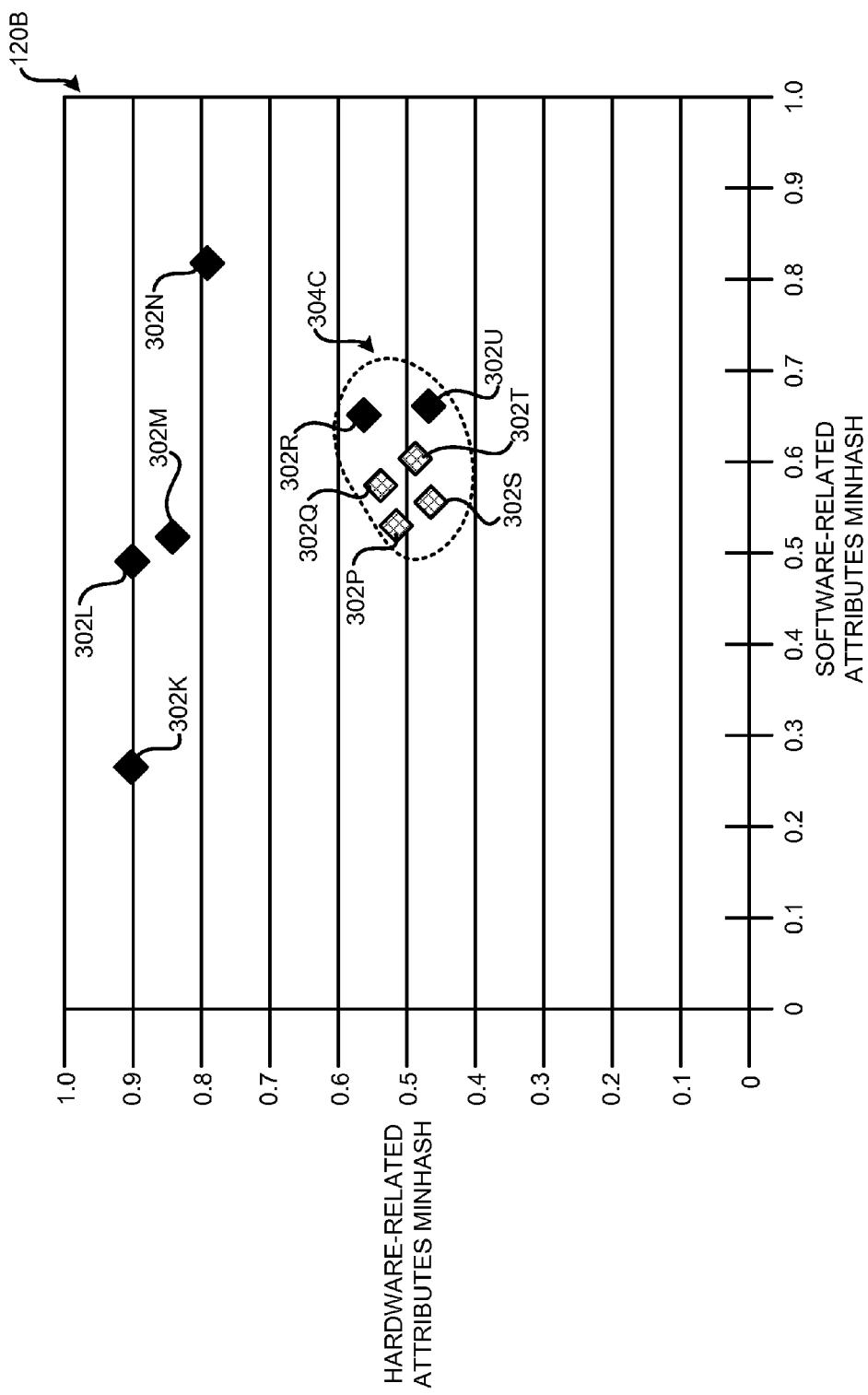
FIG. 4 is a user interface diagram showing another illustrative resource similarity visualization provided in one embodiment disclosed herein.

Once the user 106 has selected the resources 104 to be represented in the resource similarity visualization 120, the user 106 might also be permitted to select the attributes 110 of the selected resources 104 that should be utilized in generating the resource similarity visualization 120. For example, the user 106 might be permitted to specify that the similarity values for all or a subset of the hardware attributes 110 for the resources 104 be plotted against the similarity values for all or a subset of the software attributes 110 of the resources 104. An example of this type of resource similarity visualization 120 is shown in FIG. 4 and described below.

Figure 3:
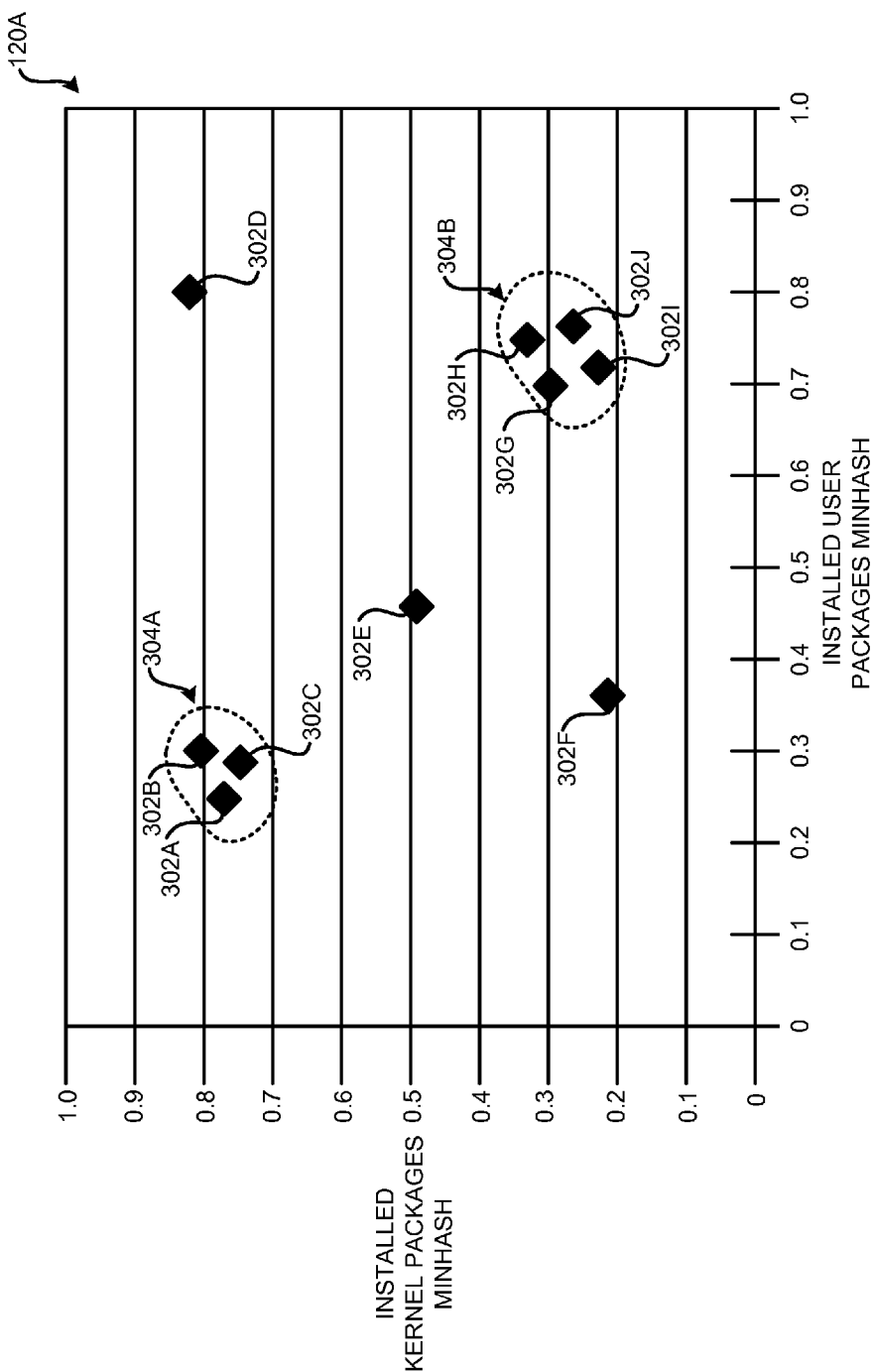
FIG. 3 is a user interface diagram showing an illustrative resource similarity visualization provided in one embodiment disclosed herein.

The user 106 might also be permitted to specify that the similarity values for a subset of the software attributes 110 for the resources 104 be plotted against the similarity values for a different subset of the software attributes 110 of the resources 104. An example of this type of resource similarity visualization 120 is shown in FIG. 3 and described below. Likewise, the user 106 might be permitted to specify that the similarity values for a subset of the hardware attributes 110 for the resources 104 be plotted against the similarity values for a different subset of the hardware attributes 110 of the resources 104. The user 106 might also be permitted to specify other preferences with respect to the generation of the resource similarity visualization 120.

Once the user 106 has specified the resources 104 and the attributes 110 of the resources 104 to be utilized in generating the resource similarity visualization 120, the visualization component 118 may generate a minhash value for the selected resources 104 based upon the values 114 associated with each resource 104 selected by the user 106. For example, if the user 106 has requested that a resource similarity visualization 120 be generated that includes both software and hardware attributes 110 for a set of the resources 104, the visualization component 118 might generate minhash values for the specified software attributes 110 of the resources 104 and for the specified hardware attributes 110 of the resources 104. In some embodiments, the minhash values may be pre-generated prior to receiving a request from a user 106 to create the resource similarity visualization 120.

Once the minhash values have been generated for the resources 104 to be included in the resource similarity visualization 120, the visualization component 118 can generate the resource similarity visualization 120. For example, in one implementation, the visualization component 118 might generate a 2D resource similarity visualization 120 that has one axis corresponding to minhash values for one subset of attributes 110 of a set of resources 104 and another axis corresponding to minhash values for another subset of the attributes 110 for the resources 104. In this example, the visualization component 118 generates the resource similarity visualization 120 by plotting the minhash values for each resource 104 on the graph. Details regarding the generation of the resource similarity visualization 120 will be provided below with regard to FIGS. 2-4.

As will also be described in greater detail below, the computed minhash values might be also be utilized to take various types of management actions with regard to resources 104 in the distributed execution environment 102. For example, resources 104 may be identified using the computed minhash values that are likely to fail at some future point in time. Appropriate remedial action might be taken to minimize the possibility of failure of these resources 104. Similarly, resources 104 might be identified using the computed minhash values that require a software or hardware update. The required update might then be applied to the identified resources 104. Other types of actions might also be taken with regard to resources 104 in the distributed execution environment 102 using the computed minhash values. Additional details regarding the various components and processes described above for visualizing the similarity between resources 104 in the distributed execution environment 102 will be presented below with regard to FIGS. 1-7.

In one implementation, the visualization component 118, or another component might be configured to expose an API or another mechanism through which customers, other users, components, or systems can obtain the computed similarity values and/or a resource similarity visualization 120 for a particular set of attributes. Through such an API, a customer of the distributed execution environment 102 might obtain the information described above and utilize this information in various ways with respect to their deployed fleet of resources.

In some implementations, the display of a resource similarity visualization 120 might be continuously updated. For example, values for the attributes utilized to compute the resource similarity visualization 120 might be retrieved on an ongoing basis. Following the updating of the attribute values, the resource similarity visualization 120 might be regenerated in the manner described above and re-displayed. In this way, a real-time or near real-time view of the similarity of resources in the distributed execution environment 102 can be provided.

Figure 2:
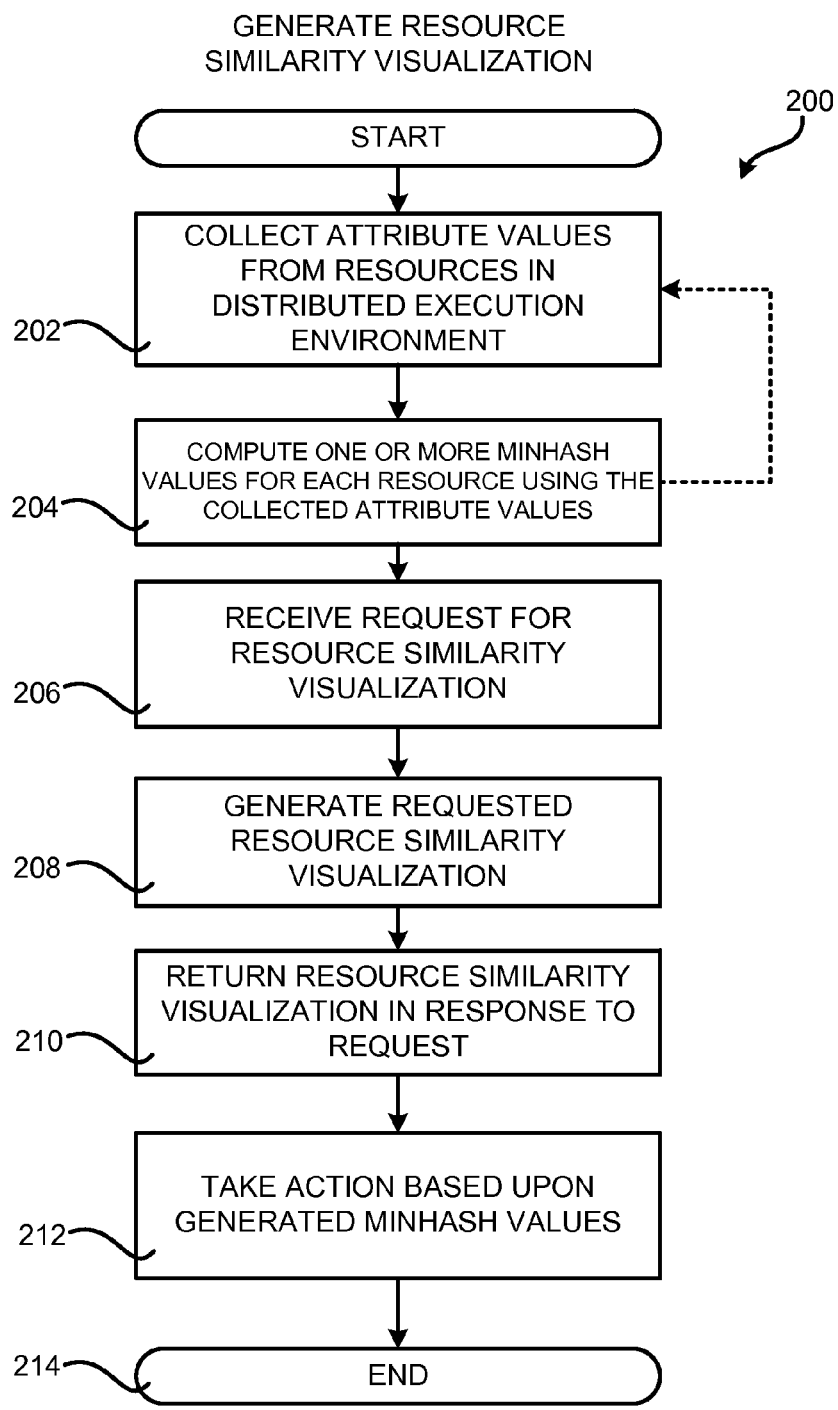
FIG. 2 is a flow diagram showing aspects of one illustrative routine for visualizing the similarity of resources in a distributed execution environment, according to one embodiment disclosed herein.

FIG. 2 is a flow diagram showing aspects of one illustrative routine 200 for creating a resource similarity visualization 120 that indicates the similarity of resources 104 in the distributed execution environment 102, according to one embodiment disclosed herein. FIG. 2 will be described in conjunction with FIGS. 3 and 4. FIG. 3 is a user interface diagram showing an illustrative resource similarity visualization 120A generated by the visualization component 118 in one embodiment disclosed herein. FIG. 4 is a user interface diagram showing another illustrative resource similarity visualization 120B generated by the visualization component 118 in one embodiment disclosed herein.

It should be appreciated that the logical operations described herein with respect to FIG. 2 and the other figures are implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 200 begins at operation 202, where the resource attribute value collection system 112 collects the values 114 for the attributes 110 of the resources 104 in the distributed execution environment 102. As mentioned above, a software component executing on one or more hardware resources 104B in the distributed execution environment 102 might collect the values 114 and provide the values 114 to the resource attribute value collection system 112. The resource attribute value collection system 112 may then store the values 114 in the attribute value data store 116 in the manner described above. Other mechanisms might also be utilized to collect and store values 114 for various attributes 110 of resources 104 in the distributed execution environment 102.

From operation 202, the routine 200 proceeds to operation 204, where the visualization component 118 computes similarity values for the resources 104. For example, in one embodiment, the visualization component 118 utilizes the minhash function 119 to compute one or more minhash values for each of the resources 104. For example, the visualization component 118 might compute a minhash value for each resource 104 utilizing all of the attributes 110 of each resource. The visualization component 118 might also compute a minhash value for each resource 104 utilizing only software attributes 110 or utilizing only hardware attributes 110. The visualization component 118 might also compute minhash values for the resources 104 utilizing other subsets of the attributes 110 or other types of attributes 110. For example, the visualization component 118 might compute minhash values for the resources 104 based upon a subset of the software attributes 110 or a subset of the hardware attributes 110. The visualization component 118 might also compute minhash values for the resources 104 based upon other subsets of the attributes 110 for each resource.

The dashed arrow between operation 204 and operation 202 in FIG. 2 indicates that the processing performed at operations 202 and 204 might be performed in a continual fashion. In this way, minhash values can be pre-generated and made available for use that are based upon current values 114 of the attributes 110. It should be appreciated, however, that the minhash values might be computed in another manner than shown in FIG. 2. For example, while FIG. 2 illustrates pre-computation of the minhash values (i.e. computation of minhash values prior to receiving a request for a resource similarity visualization 120), the minhash values needed to generate a particular resource similarity visualization 120 might be computed at or near the time a request is received to generate a resource similarity visualization 120. Other implementations might also be utilized, such as pre-computing some minhash values and computing other minhash values at the time a request for a resource similarity visualization 120 is received.

From operation 204, the routine 200 proceeds to operation 206, where a request is received for a resource similarity visualization 120. For example, a user 106 of the user computing system 108 might utilize a client application to request a resource similarity visualization 120 from the visualization component 118. In one embodiment, the client application is a Web browser application. It should be appreciated, however, that other types of applications might also be utilized in other embodiments to request, receive, and display a resource similarity visualization 120.

The request for the resource similarity visualization 120 might include various preferences regarding the creation of the resource similarity visualization 120. For example, the request might include information identifying the particular resources 104 that should be represented in the resource similarity visualization 120, the attributes of each resource 104 that the resource similarity visualization 120 should be based upon, the type of resource similarity visualization 120 (e.g. 2D, 3D, or another type of graph), the attributes that should be assigned to each axis of the resource similarity visualization 120, the colors and/or other types of formatting that should be utilized in the resource similarity visualization 120, and potentially other preferences.

From operation 206, the routine 200 proceeds to operation 208, where the visualization component 118 generates the requested resource similarity visualization 120 in response to the request received at operation 206. As mentioned above, the visualization component 118 may generate similarity values, like minhash values, for the resources 104 based upon specified attributes 110 of the resources 104. Alternately, the visualization component 118 might utilize minhash values pre-generated in the manner described above.

In order to generate a 2D resource similarity visualization 120, such as those shown in FIGS. 3 and 4, the visualization component 118 might assign each axis of the resource similarity visualization 120 to a set of attributes 110. For example, one axis might be assigned to a set of hardware attributes 110 for the resources 104 represented in the visualization 120 and another axis might be assigned to a set of software attributes 110 for the resources 104. An example of this type of visualization 120 is shown in FIG. 4, where the X-axis of the visualization 120B has been assigned to the similarity value for software attributes 110 and the Y-axis of the visualization 120B has been assigned to the similarity value for hardware attributes 110.

Alternately, one axis might be assigned to the similarity value for a set of software attributes 110 for the resources 104 represented in the visualization and another axis might be assigned to the similarity value for a different set of software attributes 110 for the resources 104. An example of this type of resource similarity visualization 120 is shown in FIG. 3, where the X-axis of the resource similarity visualization 120A has been assigned to attributes 110 associated with user-installed software packages, and the Y-axis of the resource similarity visualization 120A has been assigned to attributes 110 associated with kernel-installed software packages. The subsets of software attributes shown in FIG. 3 are merely illustrative and other subsets might be utilized to generate other types of resource similarity visualizations 120.

Once the axes of the resource similarity visualization 120 have been assigned, the visualization component 118 plots indicators representing the resources 104 utilizing the appropriate similarity values. For example, in the resource similarity visualization 120A shown in FIG. 3, indicators 302A-302J have been drawn that correspond to and represent resources 104 in the distributed execution environment 102. The X-coordinate for each of the indicators 302A-302J is defined by the minhash value computed for the attributes 110 associated with user-installed software packages for the corresponding resources 104. The Y-coordinate for each of the indicators 302A-302J is defined by the minhash value computed for the attributes 110 associated with kernel-installed software packages for the corresponding resources 104.

In the resource similarity visualization 120B shown in FIG. 4, indicators 302K-302U have been drawn that correspond to and represent resources 104 in the distributed execution environment 102. The X-coordinate for each of the indicators 302K-302U is defined by the minhash value computed for the software attributes 110 of the corresponding resources 104. The Y-coordinate for each of the indicators 302K-302U is defined by the minhash value computed for the hardware attributes 110 of the corresponding resources 104.

By generating the resource similarity visualization 120 in this way, the similarity between various resources 104 in the distributed execution environment 102 with regard to various attributes 110 can be quickly ascertained. For example, in the visualization 120A shown in FIG. 3, it can be seen that the resources 104 represented by the indicators 302A-302C have similar sets of kernel-installed software packages and similar sets of user-installed software packages. Accordingly, the resources 104 represented by the indicators 302A-302C might be grouped together in a similarity cluster 304A.

Similarly, the resources 104 represented by the indicators 302G-302J have similar sets of kernel-installed software packages and similar sets of user-installed software packages. Accordingly, the resources 104 represented by the indicators 302G-302J might be grouped together in a similarity cluster 304B. It can also be seen that the resources 104 represented by the indicators 302F and 302E have similar sets of user-installed packages but have dissimilar sets of kernel-installed packages. Other types of similarities and dissimilarities between the resources 104 represented by the indicators 302A-302J in the visualization 120A shown in FIG. 3 can also be seen.

In the example resource similarity visualization 120B shown in FIG. 4, the resources 104 represented by the indicators 302P-302U have similar hardware and software configurations. Accordingly, the resources 104 represented by the indicators 302P-302U might be placed into a similarity cluster 304C indicating their similarity. The resources 104 represented by the indicators 302K-302N have similar hardware configurations but have dissimilar software configurations. Other types of similarities and dissimilarities between the resources 104 represented by the indicators 302K-302U in the resource similarity visualization 120B shown in FIG. 4 can also be seen.

Returning now to FIG. 2, the routine 200 proceeds from operation 208 to operation 210, where the visualization component 118 returns the generated resource similarity visualization 120 to the requestor. For instance, in the example shown in FIG. 1, the resource similarity visualization 120 might be returned to a user computing system 108 that requested the resource similarity visualization 120. The resource similarity visualization 120 might then be presented to the user 106. As mentioned briefly above, the resource similarity visualization 120 might be presented by a Web browser application by way of an appropriate Web page. The resource similarity visualization 120 might also be presented in other formats by other types of applications.

From operation 210, the routine 200 proceeds to operation 212, where the user 106 might cause various types of action to be taken with regard to resources 104 represented in the resource similarity visualization 120. For example, and as discussed briefly above, the minhash values utilized to generate the resource similarity visualization 120 might be utilized to identify resources 104 that are likely to fail at some future point in time.

In the example shown in FIG. 4, for instance, the resources 104 represented by the indicators 302P, 302Q, 302S, and 302T have been displayed with formatting (i.e. crosshatching) that indicates that these resources 104 have failed or are malfunctioning in some manner. In the same similarity cluster 304C, however, there are two other resources 104 represented by the indicators 302R and 302U that have not failed. In this scenario, an inference may be made that the resources 104 represented by the indicators 302R and 302U are likely to fail because they have similar software and hardware configurations as the resources 104 represented by the indicators 302P, 302Q, 302S, and 302T. Accordingly, appropriate remedial action might be taken to minimize the possibility of failure of the resources 104 represented by the indicators 302R and 302U.

In a similar fashion, resources 104 might be identified using the minhash values computed in the manner described above that require a software or hardware update. The required update might then be applied to the identified resources 104. Other types of actions might also be taken with regard to resources 104 in the distributed execution environment 102 using the computed minhash values and the resource similarity visualization 120 generated for the resources 104. From operation 212, the routine 200 proceeds to operation 214, where it ends.

It should be appreciated that the 2D resource similarity visualizations 120 shown in FIGS. 3 and 4, and described above, are merely illustrative. It should also be appreciated that 3D resource similarity visualizations 120 might also be generated in the manner described above. In a 3D resource similarity visualization 120, a third subset of attributes 110 might be represented on a third axis (i.e. the Z-axis). Additionally, in other implementations, other factors might also be represented on one or more axes. For example, the minhash values for a set of attributes 110 might be computed at various points in time. Time can then be assigned to an axis of the resource similarity visualization 120 to indicate the change of the attributes 110 over time.

It should also be appreciated that the resource similarity visualization 120 might be presented utilizing various types of colors, formatting, special effects, animations, and other visual features in order to provide additional information. For instance, in the example described above with regard to FIG. 4, the indicators 302P, 302Q, 302S, and 302T have been displayed in a manner intended to indicate that the associated resources 104 have failed or have malfunctioned in some manner. Other types of formatting might also be utilized to indicate other types of information about the referenced resources 104 in other embodiments.

Figure 5:
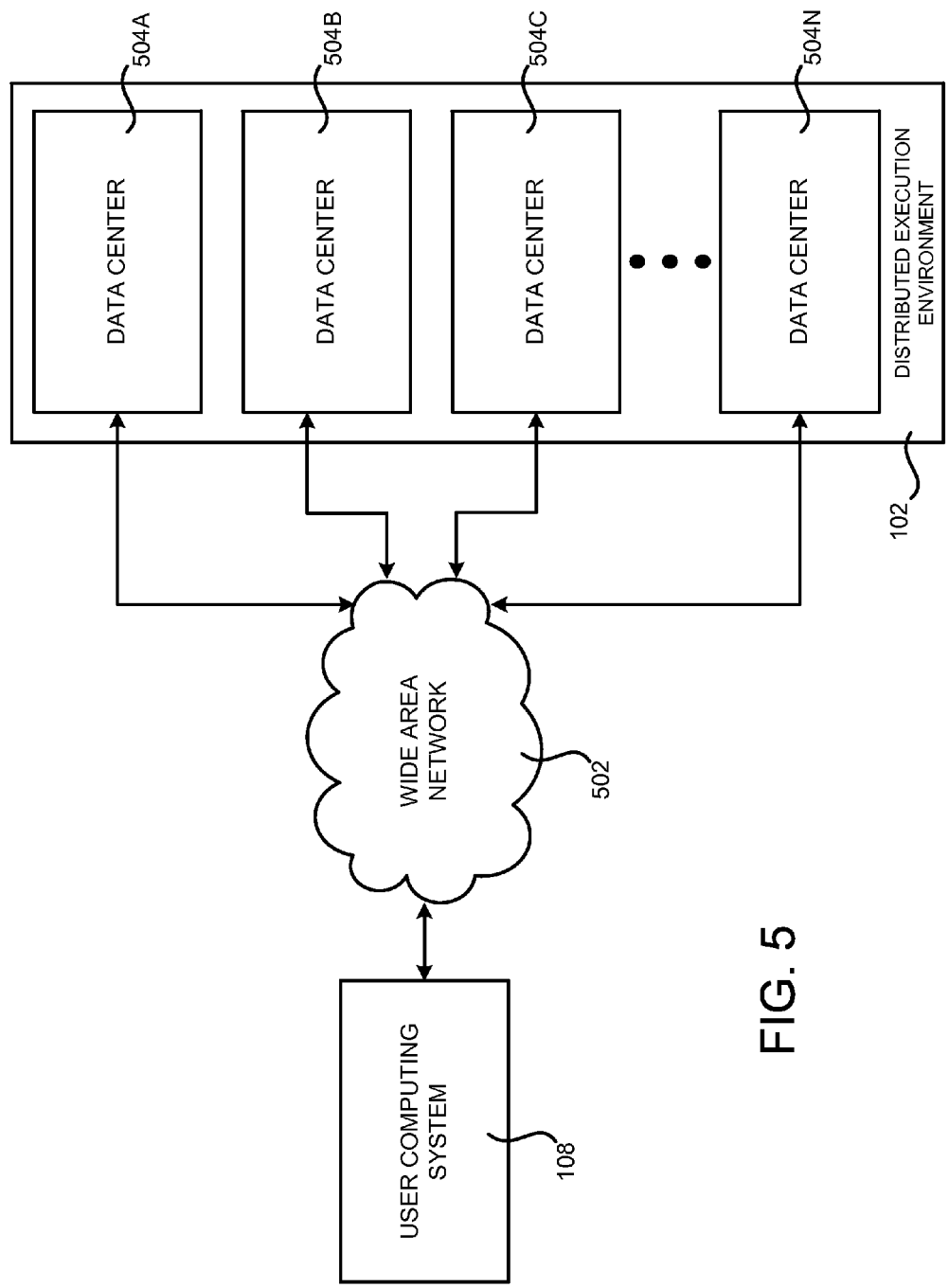
FIG. 5 is a system and network diagram that shows one illustrative operating environment for the embodiments disclosed herein that includes a distributed execution environment.

FIG. 5 and the following description are intended to provide a brief, general description of a suitable computing environment in which the embodiments described herein may be implemented. In particular, FIG. 5 is a system and network diagram that shows an illustrative operating environment that includes a distributed execution environment 102. As discussed above, the distributed execution environment 102 can provide instances of computing resources 104A on a permanent or an as-needed basis. In order to provide the instances of computing resources 104A, the distributed execution environment might utilize many software resources 104C, many hardware resources 104B, and many other types of resources 104D.

The instances of computing resources 104A provided by the distributed execution environment 102 may include various types of resources, such as data processing resources, data storage resources, networking resources, data communication resources, and the like. Each type of computing resource may be general-purpose or may be available in a number of specific configurations. For example, and as will be described in greater detail below, instances of data processing resources may be available as virtual machine instances in a number of different configurations. The virtual machine instances may be configured to execute applications, including Web servers, application servers, media servers, database servers, and other types of applications. Instances of data storage resources may include file storage devices, block storage devices, and the like. Each type or configuration of an instance of a computing resource 104A may be available in different sizes, such as large resources, consisting of many processors, large amounts of memory, and/or large storage capacity, and small resources consisting of fewer processors, smaller amounts of memory, and/or smaller storage capacity.

The instances of computing resources 104A provided by the distributed execution environment 102 are enabled in one implementation by one or more data centers 504A-504N (which may be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 might also be located in geographically disparate locations. One illustrative configuration for a data center 504 that implements some or all of the concepts and technologies disclosed herein for visualizing the similarities between resources 104 in the distributed execution environment 102 will be described below with regard to FIG. 6.

The users 106 of the distributed execution environment 102 may access the computing resources provided by the data centers 504 over a suitable data communications network, such as a Wide Area Network ("WAN") 502. Although a WAN 502 is illustrated in FIG. 5, it should be appreciated that a local-area network ("LAN"), the Internet, or any other networking topology known in the art that connects the data centers 504 to a user computing system 108 may be utilized. It should also be appreciated that combinations of such networks might also be utilized.

Figure 6:
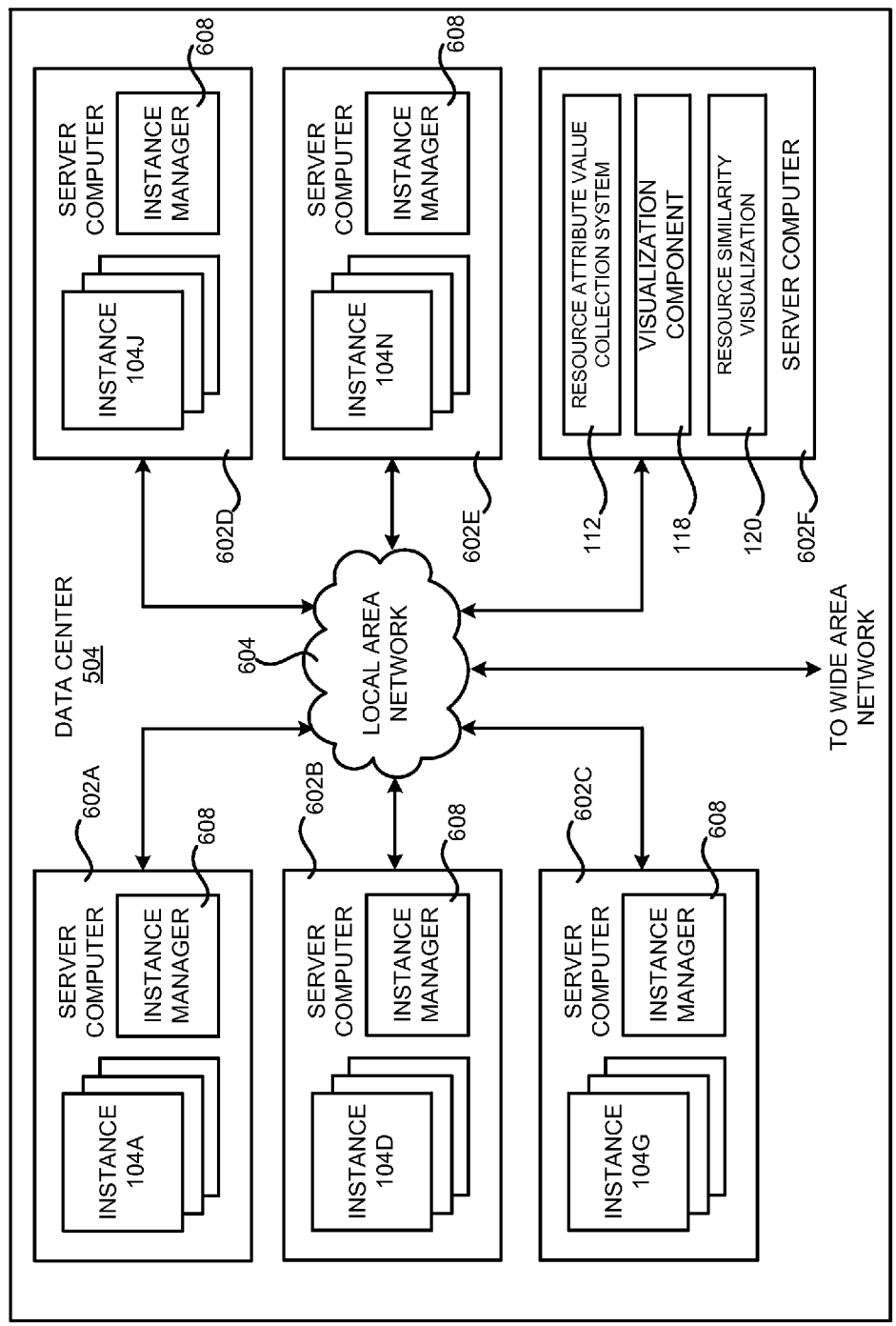
FIG. 6 is a computing system diagram that illustrates one configuration for a data center that implements aspects of the concepts and technologies disclosed herein for visualizing the similarities of resources in a distributed execution environment, according to one embodiment disclosed herein.

FIG. 6 is a computing system diagram that illustrates one configuration for a data center 504 that implements a distributed execution environment 102, including some or all of the concepts and technologies disclosed herein for visualizing the similarities between resources 104. The example data center 504 shown in FIG. 6 includes several server computers 602A-602F (which may be referred to herein singularly as "a server computer 602" or collectively as "the server computers 602") for providing instances of computing resources 104A. The server computers 602 may be standard tower or rack-mount server computers configured appropriately for providing the computing resources described herein. For example, in one implementation the server computers 602 are configured to provide instances computing resources 104A-104N.

In one embodiment, some of the instances of computing resources 104A are virtual machine instances. As known in the art, a virtual machine instance is an instance of a software implementation of a machine (i.e. a computer) that executes programs like a physical machine. Each of the servers 602 may be configured to execute an instance manager 608 capable of instantiating and managing instances of computing resources 104A. In the case of virtual machine instances, for example, the instance manager 608 might be a hypervisor or another type of program configured to enable the execution of multiple virtual machine instances on a single server 602, for example.

It should be appreciated that although the embodiments disclosed herein are described primarily in the context of virtual machine instances, other types of instances of computing resources can be utilized with the concepts and technologies disclosed herein. For example, the technologies disclosed herein might be utilized with instances of hardware resources, instances of data storage resources, instances of data communications resources, instances of networking resources, instances of database resources, and with other types of instances of computing resources.

The data center 504 shown in FIG. 6 also includes a server computer 602F reserved for executing software components for managing the operation of the data center 504, the server computers 602, the instances of computing resources 104, and other resources within the distributed execution environment 102. In particular, the server computer 602F might execute components of the resource attribute value collection system 112. The server computer 602F might also execute the visualization component 118 to generate a resource similarity visualization 120. Details regarding the operation of each of these components has been provided above. In this regard, it should be appreciated that while these components are illustrated as executing within the distributed execution environment 102, computing systems that are external to the distributed execution environment 102 might also be utilized to execute some or all of these components. Other configurations might also be utilized.

In the example data center 504 shown in FIG. 6, an appropriate local area network ("LAN") 604 is utilized to interconnect the server computers 602A-602E and the server computer 602F. The LAN 604 is also connected to the WAN 502 illustrated in FIG. 5. It should be appreciated that the configuration and network topology illustrated in FIGS. 5 and 6 has been greatly simplified and that many more computing systems, networks, and networking devices may be utilized to interconnect the various computing systems disclosed herein. Appropriate load balancing devices or software modules might also be utilized for balancing a load between each of the data centers 504A-504N, between each of the server computers 602A-602F in each data center 504, and between instances of computing resources 104 provided by the distributed execution environment 102.

It should be appreciated that the data center 504 described in FIG. 6 is merely illustrative and that other implementations might also be utilized. In particular, functionality described herein as being performed by the resource attribute value collection system 112 and the visualization component 118 might be performed by one another, might be performed by other components, or might be performed by a combination of these or other components. Additionally, it should be appreciated that the functionality provided by these components might be implemented in software, hardware, or a combination of software and hardware. Other implementations should be apparent to those skilled in the art.

Figure 7:
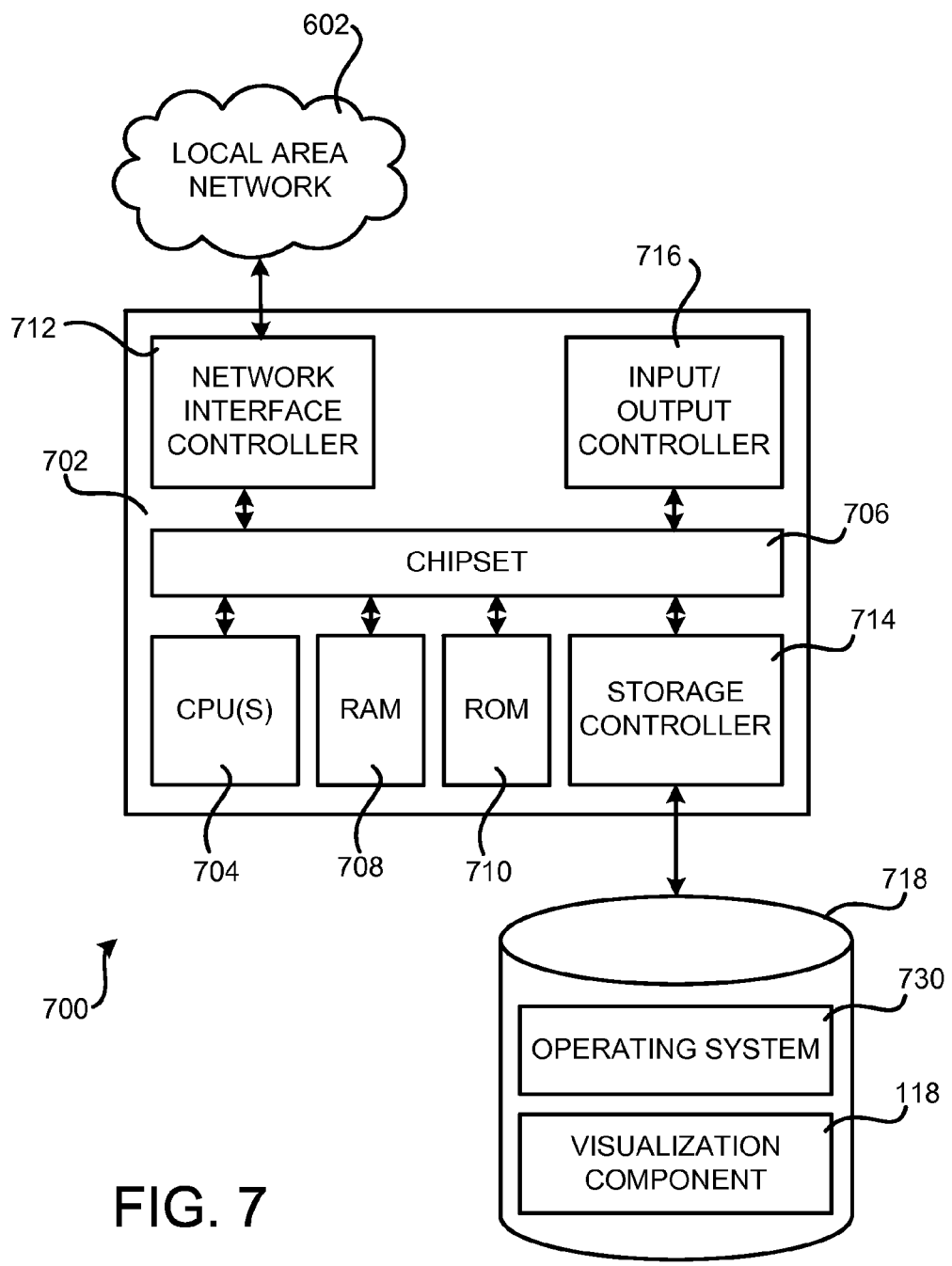
FIG. 7 is a computer architecture diagram showing one illustrative computer hardware architecture for implementing a computing device that might be utilized to implement aspects of the various embodiments presented herein.

FIG. 7 shows an example computer architecture for a computer 700 capable of executing the program components described above for visualizing the similarities between resources 104 in a distributed execution environment 102. The computer architecture shown in FIG. 7 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein described as executing on the user computing system 108, within the data centers 504A-504N, on the server computers 602A-602F, or on any other computing system mentioned herein.

The computer 700 includes a baseboard 702, or "motherboard," which is a printed circuit board to which a multitude of components or devices may be connected by way of a system bus or other electrical communication paths. In one illustrative embodiment, one or more central processing units ("CPUs") 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a random access memory ("RAM") 708, used as the main memory in the computer 700. The chipset 706 may further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM may also store other software components necessary for the operation of the computer 700 in accordance with the embodiments described herein.

The computer 700 may operate in a networked environment using logical connections to remote computing devices and computer systems through a network, such as the local area network 604. The chipset 706 may include functionality for providing network connectivity through a NIC 712, such as a gigabit Ethernet adapter. The NIC 712 is capable of connecting the computer 700 to other computing devices over the network 604. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store system programs, application programs, other program modules, and data, which have been described in greater detail herein. The mass storage device 718 may be connected to the computer 700 through a storage controller 714 connected to the chipset 706. The mass storage device 718 may consist of one or more physical storage units. The storage controller 714 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or secondary storage, and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718 described above, the computer 700 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 718 may store an operating system 730 utilized to control the operation of the computer 700. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 718 may store other system or application programs and data utilized by the computer 700, such as the visualization component 118, and/or any the other software components and data described above. The mass storage device 718 might also store other programs and data not specifically identified herein.

In one embodiment, the mass storage device 718 or other computer-readable storage media is encoded with computer-executable instructions which, when loaded into the computer 700, transforms the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, causes the computer to perform the various functions described above with regard to FIGS. 1-6.

The computer 700 may also include one or more input/output controllers 716 for receiving and processing input from a number of input devices, such as a keyboard, a mouse, a touchpad, a touch screen, an electronic stylus, or other type of input device. Similarly, the input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for visualizing the similarities between resources in a distributed execution environment have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for visualizing the similarity of resources in a distributed execution environment, comprising:

collecting, using one or more computing systems, attribute values for the resources in the distributed execution environment;

computing, using one or more computing systems, a first minhash value for the resources utilizing a first set of the attribute values, the first minhash value describing the similarity of the first set of the attributes for the resources;

computing, one or more computing systems, a second minhash value for the resources utilizing a second set of the attribute values, the second minhash value describing the similarity of the second set of the attributes for the resources; and utilizing the first minhash value and the second minhash value to generate, using one or more computing systems, a resource similarity visualization for the resources, the resource similarity visualization comprising a two dimensional graph having a first axis corresponding to the first minhash values and a second axis corresponding to the second minhash values.

2. The computer-implemented method of claim 1, wherein the first and the second sets of the attribute values comprise attribute values for software attributes of the resources in the distributed execution environment.

3. The computer-implemented method of claim 1, wherein the first set of the attribute values comprise attribute values for software attributes of the resources in the distributed execution environment, and wherein the second set of the attribute values comprise attribute values for hardware attributes of the resources in the distributed execution environment.

4. The computer-implemented method of claim 1, wherein the first and the second sets of the attribute values comprise attribute values for hardware attributes of the resources in the distributed execution environment.

5. The computer-implemented method of claim 1, wherein the resources comprise hardware resources utilized to provide instances of computing resources in the distributed execution environment.

6. The computer-implemented method of claim 1, wherein the resources comprise resources in use by a customer of the distributed execution environment.

7. The computer-implemented method of claim 1, further comprising utilizing one or more of the computed minhash values to identify one or more resources in the distributed execution environment that are likely to fail.

8. The computer-implemented method of claim 1, further comprising utilizing one or more of the computed minhash values to identify one or more resources in the distributed execution environment that require a software update.

9. The computer-implemented method of claim 1, further comprising exposing an application programming interface (API) configured to provide the first minhash values and the second minhash values.

10. The computer-implemented method of claim 1, further comprising exposing an application programming interface (API) configured to provide the resource similarity visualization.

11. A system to generate a visualization indicating the similarity between resources in a distributed execution environment, the system comprising:
   one or more computer systems configured to collect values of attributes for the resources in the distributed execution environment; and
   one or more computer systems configured to compute first minhash values for the resources from values collected for a first subset of the attributes, compute second minhash values for the resources from values collected for a second subset of the attributes, and generate the visualization indicating the similarity between the resources in the distributed execution environment utilizing the computed minhash values.

12. The system of claim 11, wherein the resources comprise hardware devices in the distributed execution environment utilized to provide instances of computing resources.

13. The system of claim 12, wherein generating the visualization indicating the similarity between the resources in the distributed execution environment utilizing the computed minhash values comprises generating a two dimensional graph using the computed minhash values, the two dimensional graph having a first axis corresponding to the first minhash values and a second axis corresponding to the second minhash values.

14. The system of claim 13, wherein the first and the second subsets of the attributes comprise software attributes of the resources in the distributed execution environment.

15. The system of claim 13, wherein the first subset of the attributes comprise software attributes of the resources in the distributed execution environment and wherein the second subset of the attributes comprise hardware attributes of the resources in the distributed execution environment.

16. The system of claim 13, wherein the first and the second subsets of the attributes comprise hardware attributes of the resources in the distributed execution environment.

17. The system of claim 13, wherein the resources comprise resources for providing instances of computing resources in use by a customer of the distributed execution environment.

18. A non-transitory computer-readable storage medium having computer-executable instructions stored thereupon which, when executed by a computer, cause the computer to:
   compute similarity values for resources in a distributed execution environment based upon one or more collected attribute values for attributes of the resources, wherein computing the similarity values for the resources in the distributed execution environment includes computing first minhash values for the resources from collected attribute values for a first subset of attributes of the resources, and computing second minhash values for the resources from collected attribute values for a second subset of attributes of the resources; and
   utilize the computed similarity values to generate a visualization indicating the similarity between the resources in the distributed execution environment.

19. The non-transitory computer-readable storage medium of claim 18, wherein the resources comprise hardware resources utilized to provide instances of computing resources in the distributed execution environment.

20. The non-transitory computer-readable storage medium of claim 19, wherein the first and second subsets of attributes of the resources comprise hardware or software attributes of the resources.

21. The non-transitory computer-readable storage medium of claim 20, wherein the visualization comprises a two dimensional graph having a first axis corresponding to the first minhash values and a second axis corresponding to the second minhash values.

22. The non-transitory computer-readable storage medium of claim 21, wherein the resources comprise resources in use by a customer of the distributed execution environment.

* * * * *